United States Patent
Barajas et al.

(10) Patent No.: US 8,805,581 B2
(45) Date of Patent: Aug. 12, 2014

(54) PROCEDURAL MEMORY LEARNING AND ROBOT CONTROL

(75) Inventors: Leandro G. Barajas, Harvest, AL (US); Adam M Sanders, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 13/400,969

(22) Filed: Feb. 21, 2012

(65) Prior Publication Data

US 2013/0218335 A1 Aug. 22, 2013

(51) Int. Cl.
*G05B 19/04* (2006.01)

(52) U.S. Cl.
USPC .......... 700/246; 700/245; 700/247; 700/250; 700/258; 700/262; 700/264

(58) Field of Classification Search
USPC .......... 700/245, 246, 247, 250, 258, 262, 264
See application file for complete search history.

(56) References Cited

U.S. PATENT DOCUMENTS

2004/0103108 A1* 5/2004 Andreev et al. ............... 707/100
2007/0288453 A1* 12/2007 Podilchuk ........................ 707/5

* cited by examiner

*Primary Examiner* — Khoi Tran
*Assistant Examiner* — Jorge Peche
(74) *Attorney, Agent, or Firm* — Mark S. Cohen; Pearl Cohen Zedek Latzer Baratz LLP

(57) ABSTRACT

Methods and apparatus for procedural memory learning to control a robot by demonstrating a task action to the robot and having the robot learn the action according to a similarity matrix of correlated values, attributes, and parameters obtained from the robot as the robot performs the demonstrated action. Learning is done by an artificial neural network associated with the robot controller, so that the robot learns to perform the task associated with the similarity matrix. Extended similarity matrices can contain integrated and differentiated values of variables. Procedural memory learning reduces overhead in instructing robots to perform tasks. Continued learning improves performance and provides automatic compensation for changes in robot condition and environmental factors.

12 Claims, 5 Drawing Sheets

PROCEDURAL MEMORY LEARNING AND ROBOT CONTROL

BACKGROUND

Machine controllers used in robotics, manufacturing, aerospace, industrial machinery, and other industries are typically programmed to perform a specific set of predefined movements or actions. This may be time-consuming and resource-intensive. For example, programming a robot to perform a single repetitive task may require all robot components to be fixtured. Once programmed, the robot may be unable to adapt, compensate for changes, or adjust to a new operating environment. Changes in robot function typically require reprogramming, verification, validation, and other processes to ensure proper operation.

SUMMARY

Embodiments of the present invention provide for learning by demonstration—a robot controller learns by duplicating demonstrated actions through trial and error. Mastery of the task allows the robot controller to execute similar, but different tasks. In addition, results of the learning are persistent, and the robot is able to compensate for the effects of aging, wear, and changing environmental conditions. Not only is pre-teaching of the robot unnecessary, but it is also unnecessary to explicitly formalize low-level commands involved in the execution of the task.

A procedural memory controller is trained during the normal operation of the robot by observing and correlating disturbances with desired outcomes. Once the correlations, sequences and adequate combinations have been found, this controller replaces the high-level control mechanisms. Embodiments of the present invention utilize existing declarative memory model controllers (e.g., path planning, forward kinematics and inverse kinematics) in conjunction with a procedural memory controller, which acts as an error compensator to modulate the timing and actuation of robot end effectors. A declarative memory controller may be programmed to perform sequences of tasks.

According to embodiments of the present invention, multiple input signals (non-limiting examples of which include: sensor outputs, actuator inputs, attributes, positions, and other relevant measurable variables of a robotic procedure) are monitored during semi-supervised learning demonstrations. In certain embodiments, these signals are also differentiated and integrated to provide recursive extensions. Similarity matrices are then developed to summarize how the variables behave with respect to one another, and these matrices are used as inputs to a learning algorithm. Specific examples utilize correlation, cross-correlation, rank correlation, product-of-moments correlations, distance correlation, and other measures of relation. Although linear relationships are typically faster to analyze, non-linear relationships may also be used.

Sensors include devices internal to the robot (non-limiting examples of which include: strain gauges; accelerometers; position detectors; electrical power sensors, such as RMS current and voltage meters; and component performance evaluators, such as vibration detectors and settling time measurement) as well as devices external to the robot (non-limiting examples of which include video cameras and proximity detectors). Actuators are typically bi-state devices, non-limiting examples of which include on/off switches and open/close grippers).

In semi-supervised sequence learning according to embodiments of the present invention, the system is instructed to use the values in the matrices as a goal for the subject procedure. The more closely the robot's output values correlate with those of the matrices, the better the robot is carrying out the subject procedure. By seeking to optimize the correlation between robot output and the goal matrices, the controller learns how best to carry out the procedure. In examples of the invention, the learning process goes on, so that the controller continually compensates for changes over time in the operating environment and condition of the robot.

BRIEF DESCRIPTION OF THE DRAWINGS

The subject matter regarded as the invention is particularly pointed out and distinctly claimed in the concluding portion of the specification. Embodiments of the present invention, both as to organization and method of operation, together with objects, features, and advantages thereof, may best be understood by reference to the following detailed description, when read with the accompanying drawings illustrating the embodiments, in which:

Figure 1:
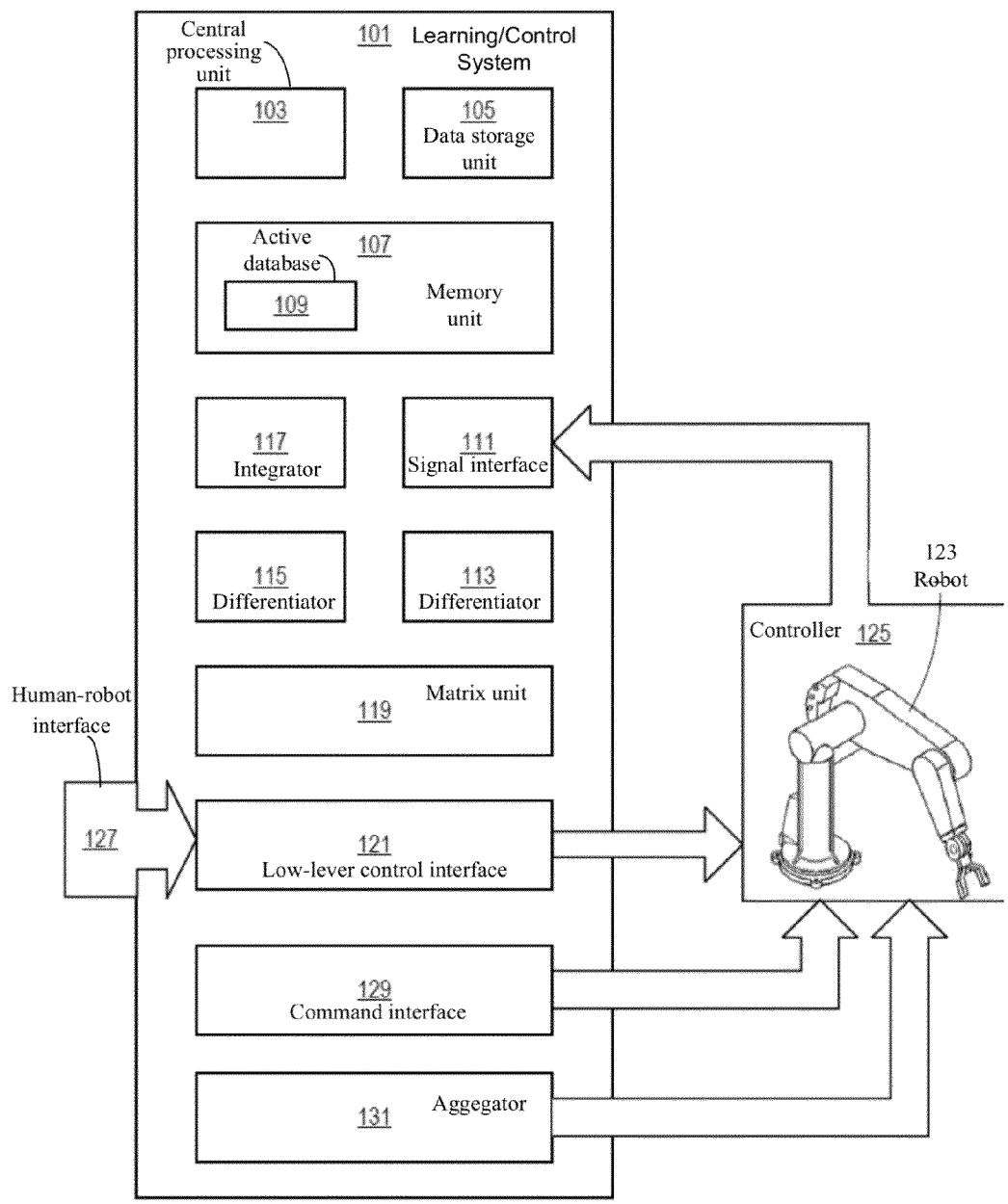
FIG. 1 illustrates a system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 illustrates a learning/control system 101 according to examples of the present invention. System 101 contains a central processing unit 103, a data storage unit 105, and a memory unit 107, which includes an active database 109. A signal interface 111 is capable of receiving signals from a robot 123 via a controller 125 which contains an artificial neural network. A correlator 113 is capable of correlating two or more signals and producing a correlation output, non-limiting examples of which include: cross-correlation, rank correlation, product-of-moments correlations, and distance correlation. A differentiator 115 is capable of outputting a time-derivative of a signal, including higher-order derivatives; and an integrator 117 is capable of outputting a time integral of a signal. Outputs of differentiator 115 and integrator 117 can be input into correlator 113 under control of processing unit 103. A matrix unit 119 is capable of generating similarity matrices containing values output by correlator 113, and for sending matrices to the artificial neural network (ANN) via controller 125. In examples of the invention, matrices generated by matrix unit 119 are stored in data storage unit 105. A low-level control interface 121 sends direct control commands to robot 123 via controller 125. This can be done via a human-robot interface 127, in which a human operator directly controls robot 123 via controller 125 using hand controls, such as a joystick or similar device; alternatively, control commands to robot 123 can be generated by software running on system 101 via a command interface 129 to controller 125. In embodiments of the invention, a "command" is an instruction which can be interpreted by the robot controller at a low level. Commands can be expressed in a formal language context, such as "Go to <X, Y, Z>", where <X, Y, Z> represents a point in a coordinate which the robot controller is programmed to recognize. An aggregator 131 combines command signals from the ANN according to a kinematics model of robot 123 and sends the resulting modulated control signals to robot 123 via control interface 125.

As discussed below, direct control of robot 123 (either via human-robot interface 127 or by programmatic control) provides robot 123 with a demonstration of the action which is to be learned. A benefit of programmatic control is that the demonstrated action may be repeated exactly, and may be repeated a large number of times. In embodiments of the invention, the number of repetitions of the action is denoted as N.

In general, the signals and commands associated with robot 123 are varying quantities—they are functions of time and/or frequency, or other parameters.

Figure 2:
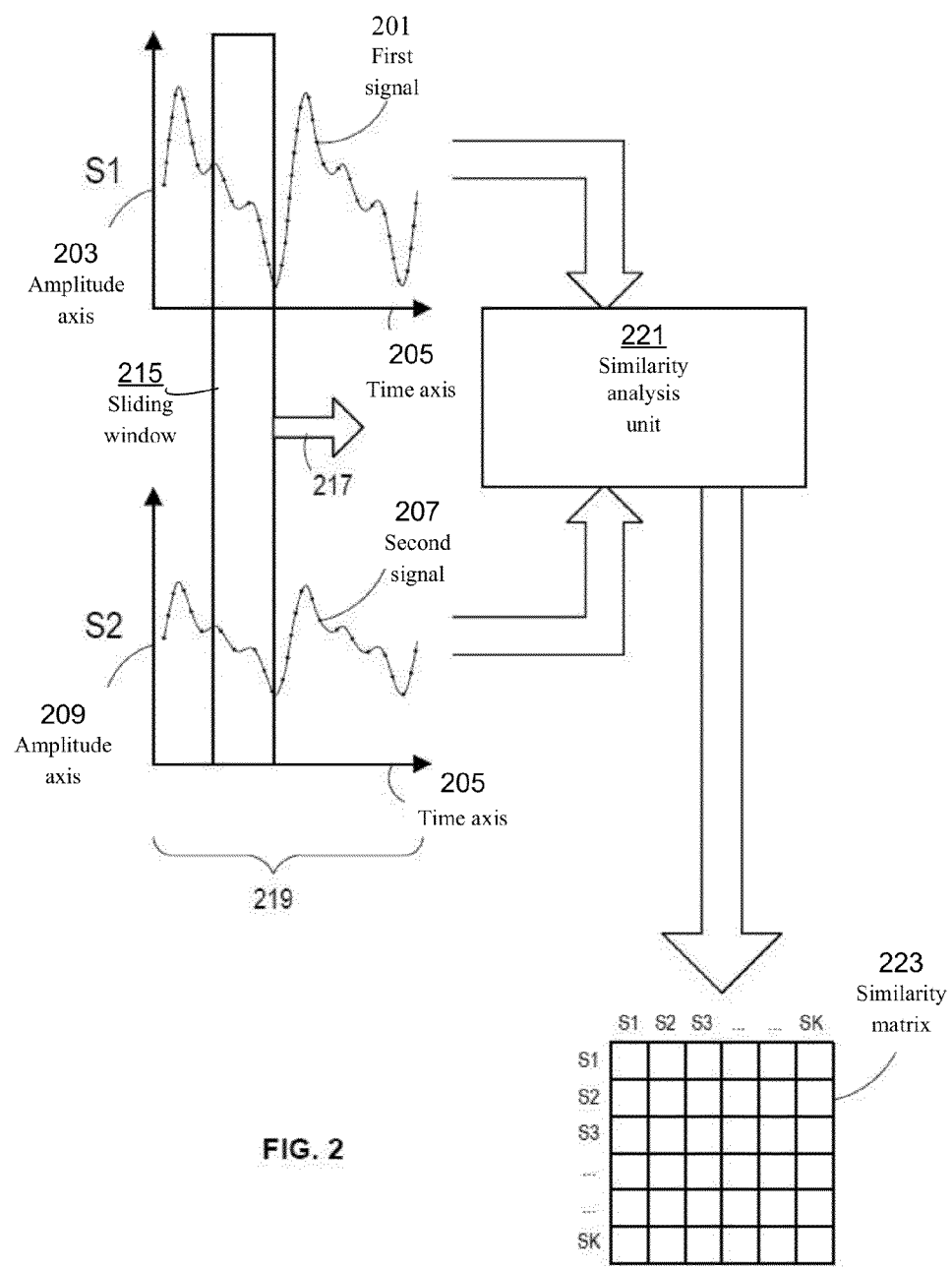
FIG. 2 illustrates elements of a method according to an embodiment of the present invention.

According to embodiments of the invention, multiple signals are received from robot 123 and compared with one another to obtain a measure of similarity. FIG. 2 illustrates comparison of two signals according to an embodiment. A first signal 201, denoted as S1, is shown as a plot according to an amplitude axis 203 with respect to a time axis 205; and a second signal 207, denoted as S2, is shown as a plot according to an amplitude axis 209 with respect to a time axis 211. S1 signal 201 and S2 signal 207 are two signals for illustration, taken from a sample set 219 containing N samples each of K different signals. A sliding window 215, sliding in a direction 217, samples both signals and feeds the samples into a similarity analysis unit 221. In one example, similarity analysis unit 221 analyzes the similarity of S1 signal 201 and S2 signal 207 by evaluating functions of similarity between them. In a non-limiting example, similarity analysis unit 221 performs a magnitude-phase cross-correlation of S1 signal 201 and S2 signal 207. The correlated values are then placed in the appropriate entries to thereby compute a K×K similarity matrix 223. In general, the correlation values are complex numbers, representing correlations both in magnitude and in phase. In certain embodiments similarity matrix 223 is represented as two separate matrices, one containing the real part of the correlation, and the other containing the imaginary part. In some embodiments, the elements of similarity matrix 223 are values which are functions of the correlations; non-limiting examples of such functions include normalization functions, weighing functions, and so forth. It is not necessary to perform an explicit averaging operation when the action is repeated N times to yield N samples; the correlation itself takes the repetition into account.

Similarity matrix 223 is a function of time, and therefore many instances of matrix 223 are stored in memory, in order to approximate the time-varying functions. In a non-limiting example, a ten-second action that is broken down into snapshots every 0.1 second has 100 instances of matrix 223 stored in memory or a database entry. A similarity matrix M(t) can be translated in time by $T_0$ seconds simply by applying an offset to obtain $M(t+T_0)$. Thus, having a similarity matrix for a particular action automatically provides a similarity matrix for the same action delayed in time.

Figure 3:
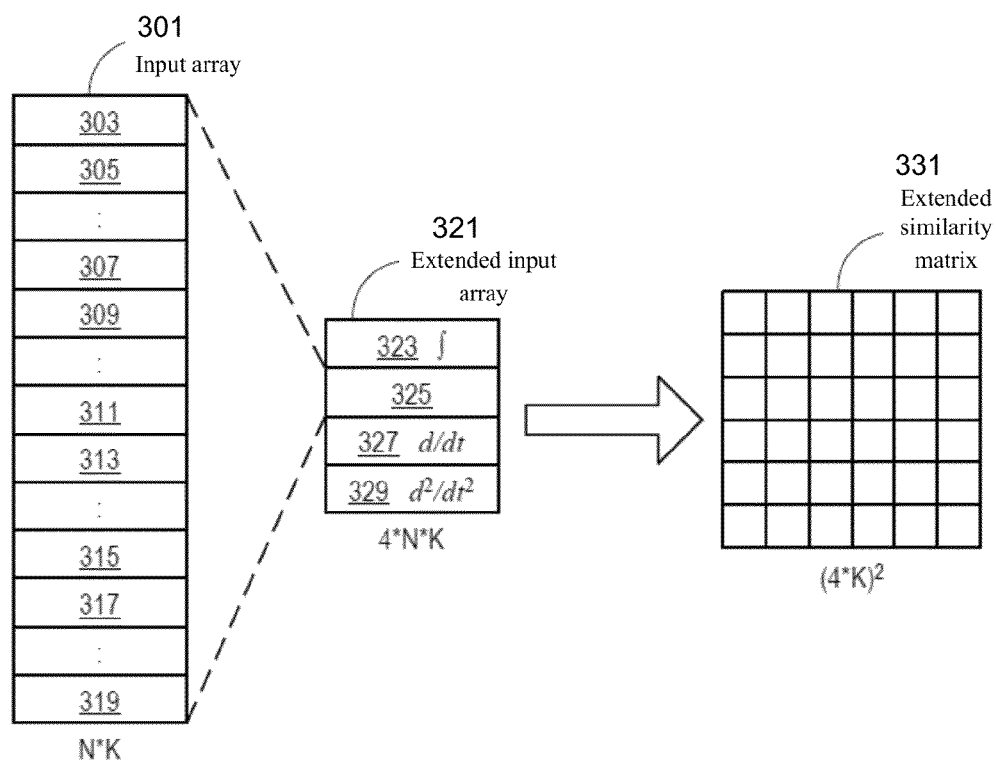
FIG. 3 illustrates elements of a method according to an embodiment of the present invention.

FIG. 3 illustrates an extension of elements of FIG. 2, described above. An N×K input array 301 contains N samples each of K different signals. Non-limiting examples of signals include: a first sensor input 303, a second sensor input 305, . . . ; a first actuator input 307, a second actuator input 309, . . . ; a first attribute input 311, a second attribute input 313, . . . ; a first position input 315, a second position input 317, . . . ; and finishing with a Kth input 319.

Input array 301 is entered as a state input 325, which constitutes N×K elements of an L×N×K extended input array 321. In the non-limiting example of FIG. 3, L=4, but other values of L are also possible.

In the non-limiting example of FIG. 3, each element of input array 301 is time-integrated to produce an additional N×K elements for an integrated state input 323. Each element of input array 301 is time-differentiated to produce an additional N×K elements for first derivative state input 327. Each element of first derivative state input 327 is again time-differentiated to produce an additional N×K elements for second derivative state input 329. In other examples, other higher-order moments are used. In the example of FIG. 3, the second derivative of a position sensor yields an acceleration value. In another example (not illustrated), the double integral of an acceleration sensor yields a position offset. When a second derivative, a first derivative, the state, an integral, and a double integral are used, L=5.

The elements of extended input array 321 (which are each varying quantities) are correlated to produce a (4×K)×(4×K) =16×$K^2$ square extended similarity matrix 331 (using the value L=4, as illustrated in the non-limiting example of FIG. 3). In general, element i,j of extended similarity matrix 331 is the correlation of signal $S_i$ with signal $S_j$.

Extended similarity matrix 331 characterizes the motion of the robot during the performance of a task—not only individual aspects of the motion, but also the way each aspect relates to every other aspect.

In addition to Amplitude-Time Domain analysis of signals as described for the examples above, other examples use Amplitude-Frequency Domain analysis (Fourier Transform), Frequency-Time analysis (Short-Time Fourier Transform, or STFT), and Time-Wavelet ("Multi-Resolution") analysis.

Other or different series of operations may also be used.

Figure 4:
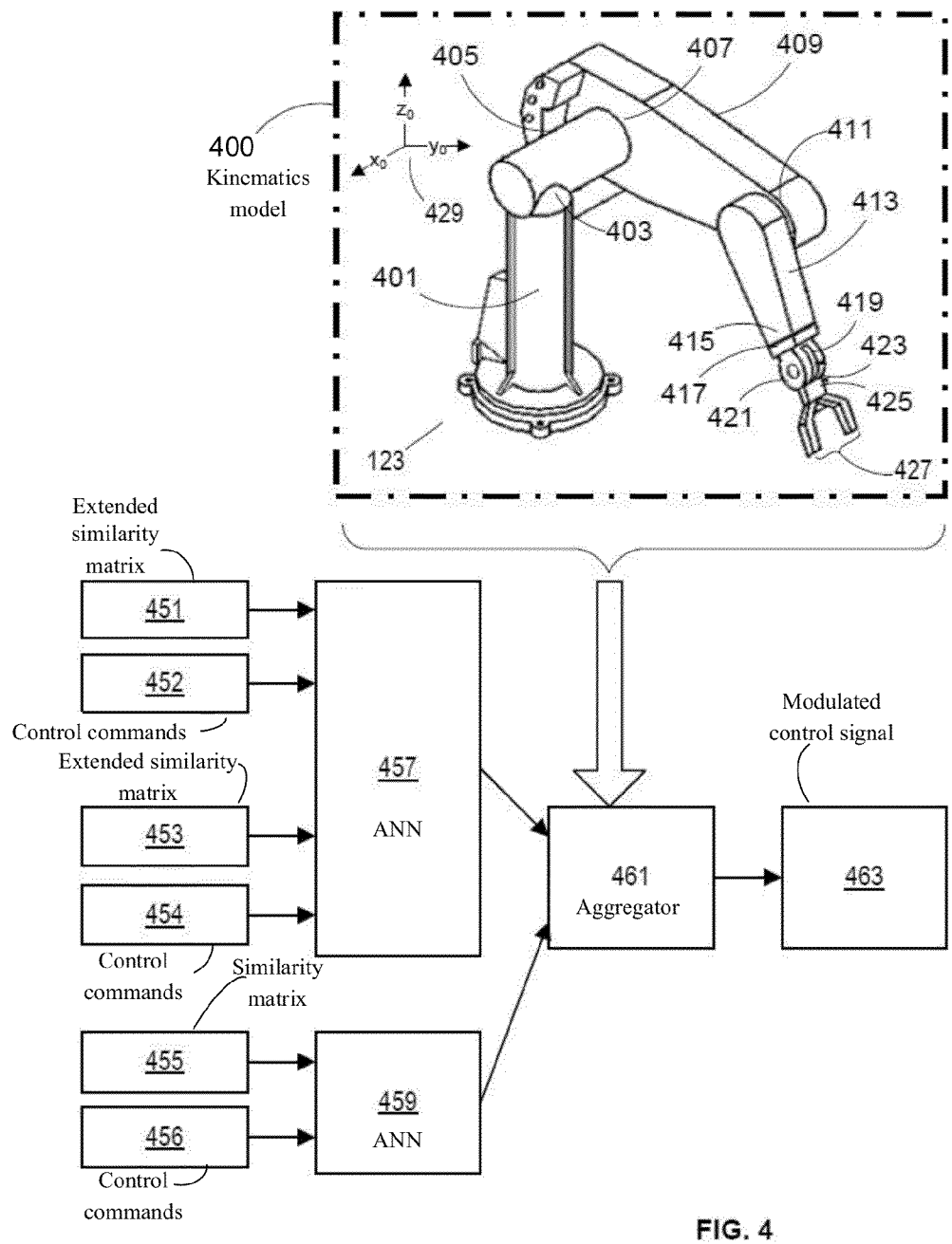
FIG. 4 illustrates elements of a method according to an embodiment of the present invention.

FIG. 4. illustrates elements of a method according to a non-limiting example, as follows: A kinematics model 400 for robot 123 includes modeling elements for: link components 401, 405, 409, 413, 417, 421, and 425; joints 403, 407, 411, 415, 419, and 423; and a gripper 427. Positions and orientations are measured relative to a coordinate system 429.

An extended similarity matrix 451 for a "move left" action is input to an artificial neural network ("ANN") 457 along with control commands 452 for the "move left" action. ANN 457 thus learns to associate similarity matrix 451 with "move left" action control commands 452. An extended similarity matrix 453 for a "move up in 5 seconds" action is also input to ANN 457 along with control commands 454 for the "move up in 5 seconds" action. ANN 457 thus also learns to associate similarity matrix 453 with "move up in 5 seconds" action control commands 454. When presented with extended similarity matrices 451 and 453 ANN 457 outputs control signals for controlling robot 123 to perform the combined actions "move left" and "move up in 5 seconds".

According to certain embodiments of the invention, each action group has its own similarity matrix, and in this non-limiting example, an extended similarity matrix 455 for a "close gripper" operation is also input to an artificial neural network 459 along with control commands 456 for the "close gripper" operation. ANN 459 thus learns to associate similarity matrix 455 with "close gripper" operation control commands 456. In this example, the "close gripper" action is included in a different action group from the "move left" and the "move up in 5 seconds", because the "move" actions involve continuous positioning motion with position sensing, whereas the "close" action involves a binary condition (open or closed) with force sensing.

For a "close gripper, then move left, then move up in 5 seconds" task, the above-described outputs are combined in an aggregator 461 to produce a modulated control signal 463 to robot 123, according to a kinematics model 400. In certain embodiments of the invention where the control signals output from ANN 457 and 459 are linear, aggregator 461 aggregates the control signals by performing a summation. In embodiments of the invention, an arbitrary number of different action groups can be aggregated together to perform a specific task.

In "semi-supervised learning", supervised learning is needed only when initializing the system and in making changes, corrections, and performing periodic maintenance. In an embodiment of the invention, maintenance retraining is performed every 100 cycles. In between supervised learning sessions, the system is capable of unsupervised operation without modification to the control loop.

Kinematics models are typically used in robotics to relate end-effector position to joint parameters (forward kinematics models) and joint parameters to the position of the end-effector (inverse kinematics models). Kinematics models typically involve sets of joint constraints, so input of kinematics model 400 into aggregator 461 assures that modulated control signal 463 will observe the constraints of robot 123.

The combination functions as a control loop for robot 400. The process is repeated, measuring the parameters, attributes, and signals necessary for recalculating extended similarity matrices 451, 453, and 455.

Figure 5:
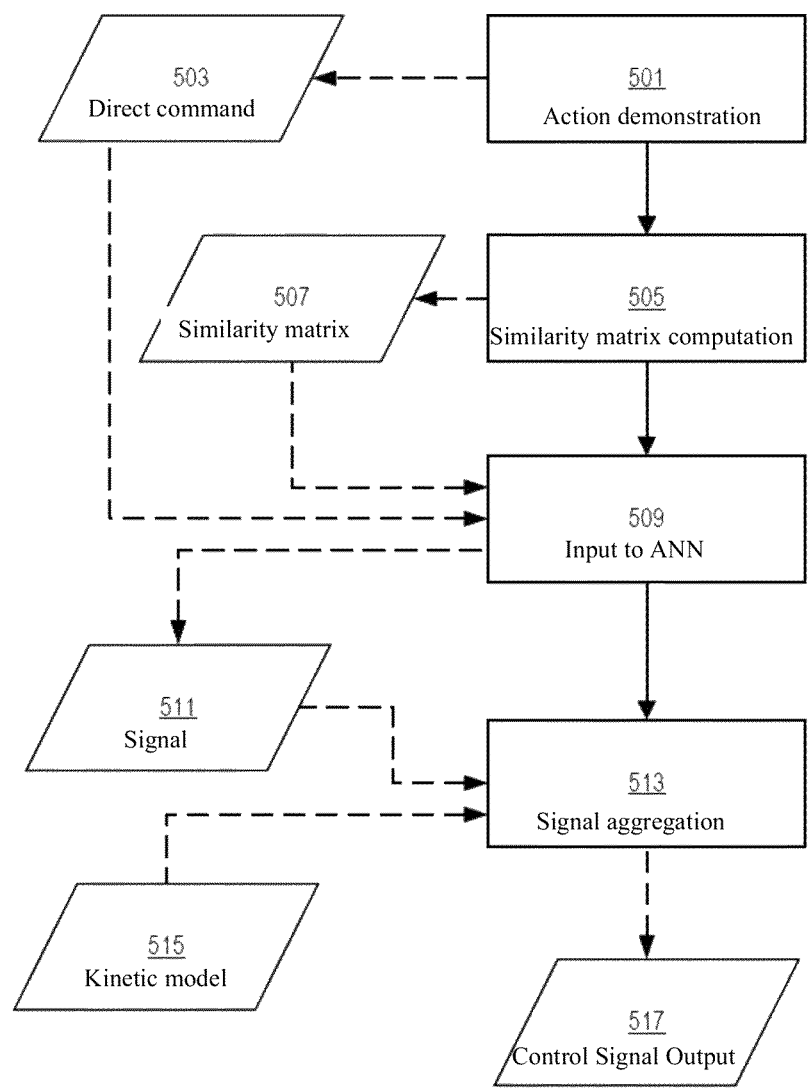
FIG. 5 illustrates a flowchart of a method according to an embodiment of the present invention.

FIG. 5 illustrates a flowchart of a method according to an embodiment of the present invention. In a step 501 an action is demonstrated to a robot with a direct command 503. In a step 505 a similarity matrix 507 is computed, and in a step 509 direct command 503 and similarity matrix 507 are input to an artificial neural network (ANN) to obtain a signal 511. In a step 513, signal 511 is aggregated according to a kinematics model 515 of the robot, to output a modulated control signal 517 to control the robot to perform the action.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of non-transient tangible media suitable for storing electronic instructions. It will be appreciated that a variety of programming languages may be used to implement the teachings of the invention as described herein. Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for procedural memory learning to control a robot to perform a task, the method comprising:
   using a control system to:
       compute a similarity matrix whose elements comprise values according to at least one function of similarity of a plurality of signals from the robot, the signals related to an action of the task performed by the robot with direct control command via a low-level interface;
       input into an artificial neural network (ANN) controller of the robot:
           the direct control command; and
           the similarity matrix;
       receive control signals from the ANN controller to control the robot;
       aggregate the control signals from the ANN controller by an aggregator according to a kinematics model of the robot; and
       send aggregated control signals from the aggregator to the robot, to perform the task.

2. The method of claim 1, wherein the at least one function of similarity is selected from a group consisting of: correlation, cross-correlation, rank correlation, product-of-moments correlations, and distance correlation.

3. The method of claim 1, wherein the values of the elements of the similarity matrix are complex numbers having real parts and imaginary parts.

4. The method of claim 3, wherein the real parts and the imaginary parts are expressed as two separate matrices.

5. The method of claim 1, wherein the similarity matrix is an extended similarity matrix whose values additionally include at least one moment selected from a group consisting of: an integrated value and a differentiated value.

6. The method of claim 1, further comprising receiving additional control signals from an artificial neural network controller, and aggregating the additional control signals with the control signals by the aggregator.

7. An apparatus for procedural memory learning to control a robot to perform a task, the robot having a robot controller which includes an artificial neural network (ANN), the apparatus comprising:
- a signal interface for receiving a plurality of signals from the robot controller;
- a correlator for generating a correlation of at least two of the signals and producing a correlation output;
- a matrix unit for generating a similarity matrix having an element containing the correlation and sending the matrix to the ANN via the robot controller;
- a low-level control interface for sending direct control commands to the robot controller; and
- an aggregator for aggregating control signals from the ANN according to a kinematics model of the robot.

8. The apparatus of claim 7, further comprising a differentiator, for generating derivative values to extend the similarity matrix.

9. The apparatus of claim 7, further comprising an integrator, for generating integrated values to extend the similarity matrix.

10. A computer-readable non-transitory storage medium including computer-executable instructions for procedural memory learning to control a robot to perform a task, which instructions, when executed by a computer, cause the computer to:
- compute a similarity matrix whose elements comprise values according to at least one function of similarity of a plurality of signals from the robot, the signals related to an action of the task performed by the robot with direct control command via a low-level interface;
- input into an artificial neural network (ANN) controller of the robot:
  - the direct control command; and
  - the similarity matrix;
- receive control signals from the ANN controller to control the robot;
- aggregate the control signals from the ANN controller by an aggregator according to a kinematics model of the robot; and
- send-aggregated control signals from the aggregator to the robot, to perform the task.

11. The computer-readable non-transitory storage medium of claim 10, wherein the at least one function of similarity is selected from a group consisting of: correlation, cross-correlation, rank correlation, product-of-moments correlations, and distance correlation.

12. The computer-readable non-transitory storage medium of claim 10, wherein the similarity matrix is an extended similarity matrix whose values additionally include at least one moment selected from a group consisting of: an integrated value and a differentiated value.

* * * * *